March 26, 1929.  C. H. HUGHES  1,706,734
FRUIT GRADING MACHINE
Filed April 14, 1926  4 Sheets-Sheet 1
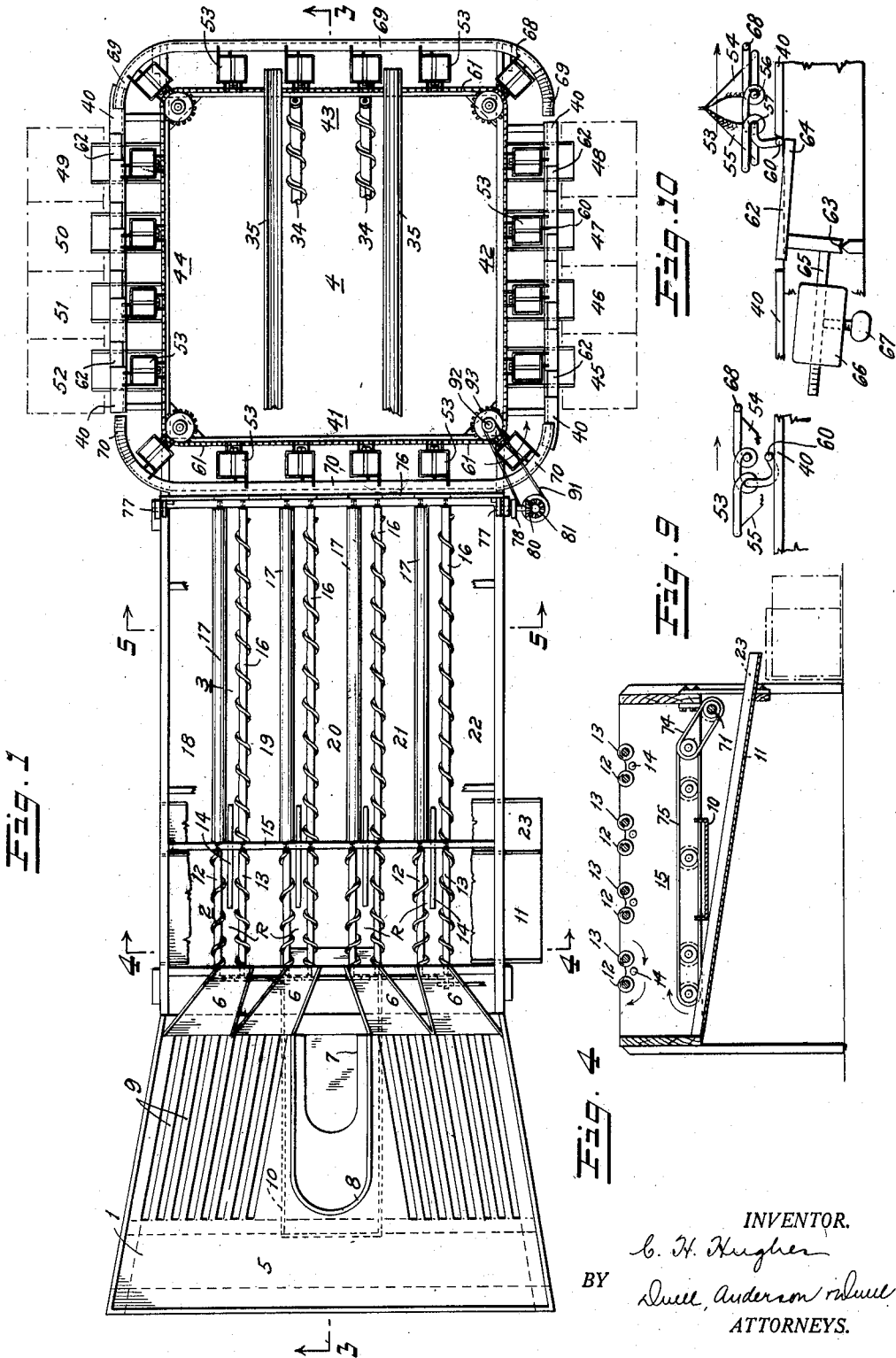
INVENTOR.
C. H. Hughes
BY
Duell, Anderson & Duell
ATTORNEYS.

March 26, 1929. C. H. HUGHES 1,706,734
FRUIT GRADING MACHINE
Filed April 14, 1926 4 Sheets-Sheet 2
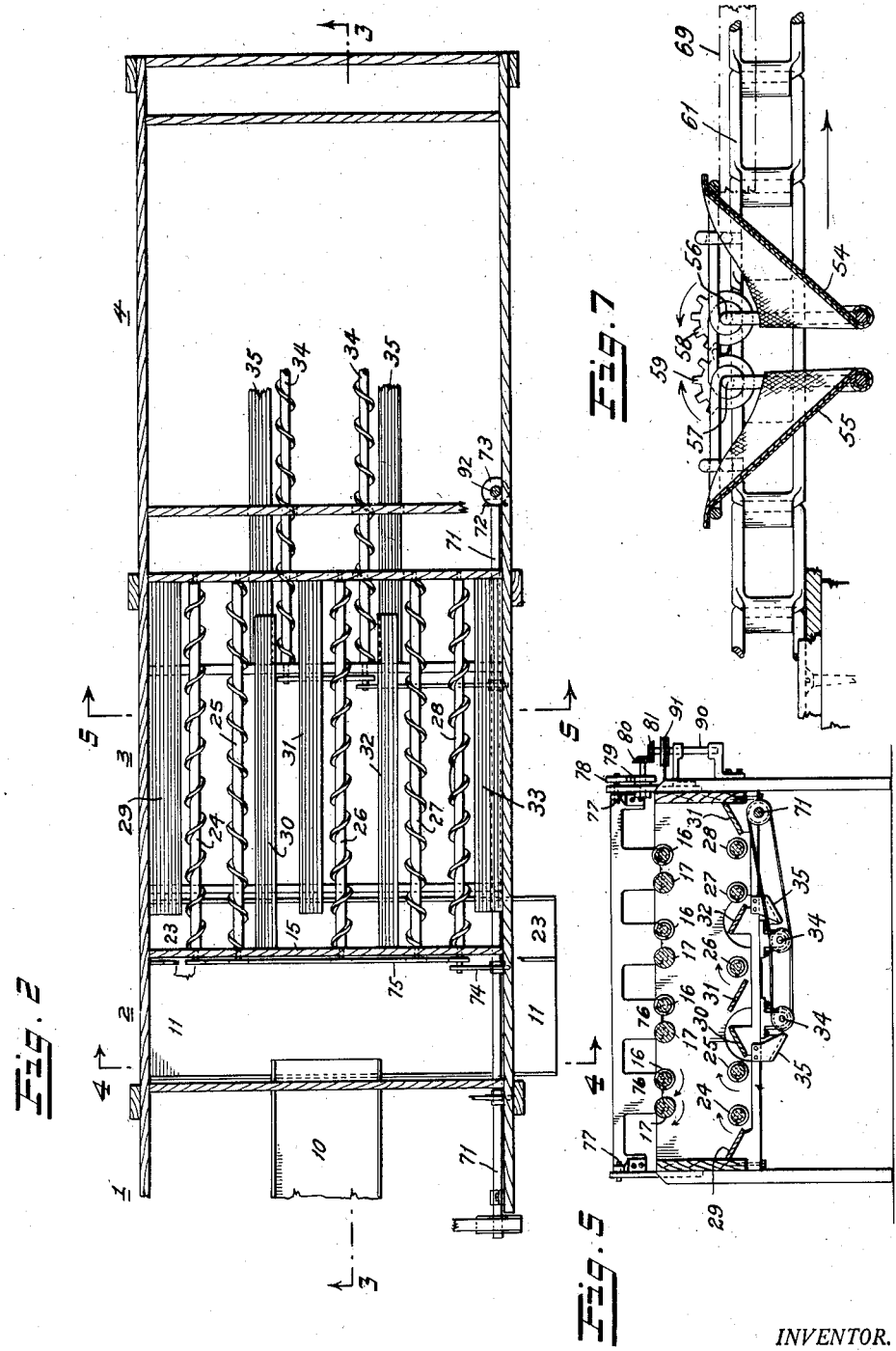
INVENTOR.
C. H. Hughes
BY Duell, Anderson & Duell
ATTORNEYS.

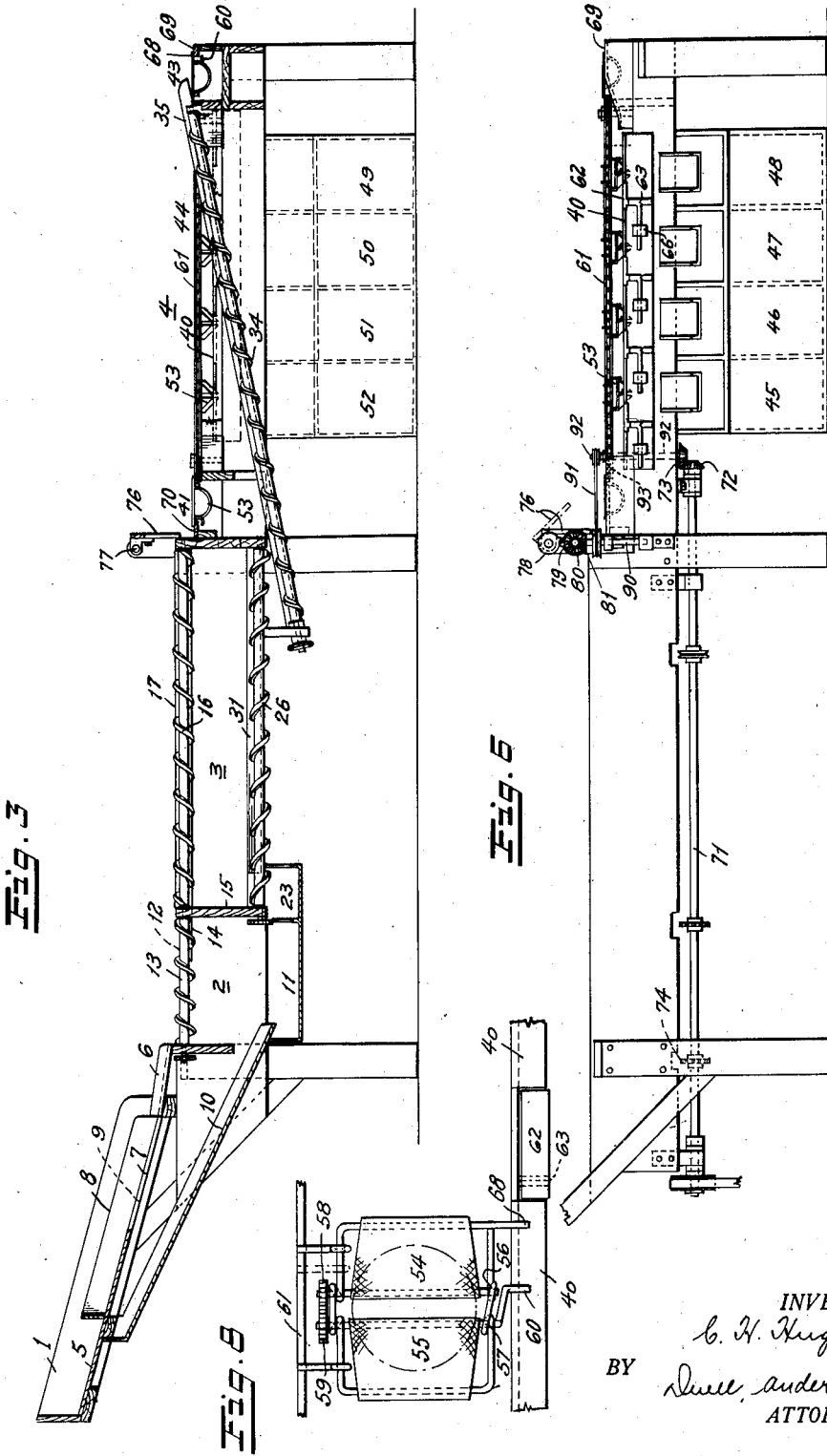

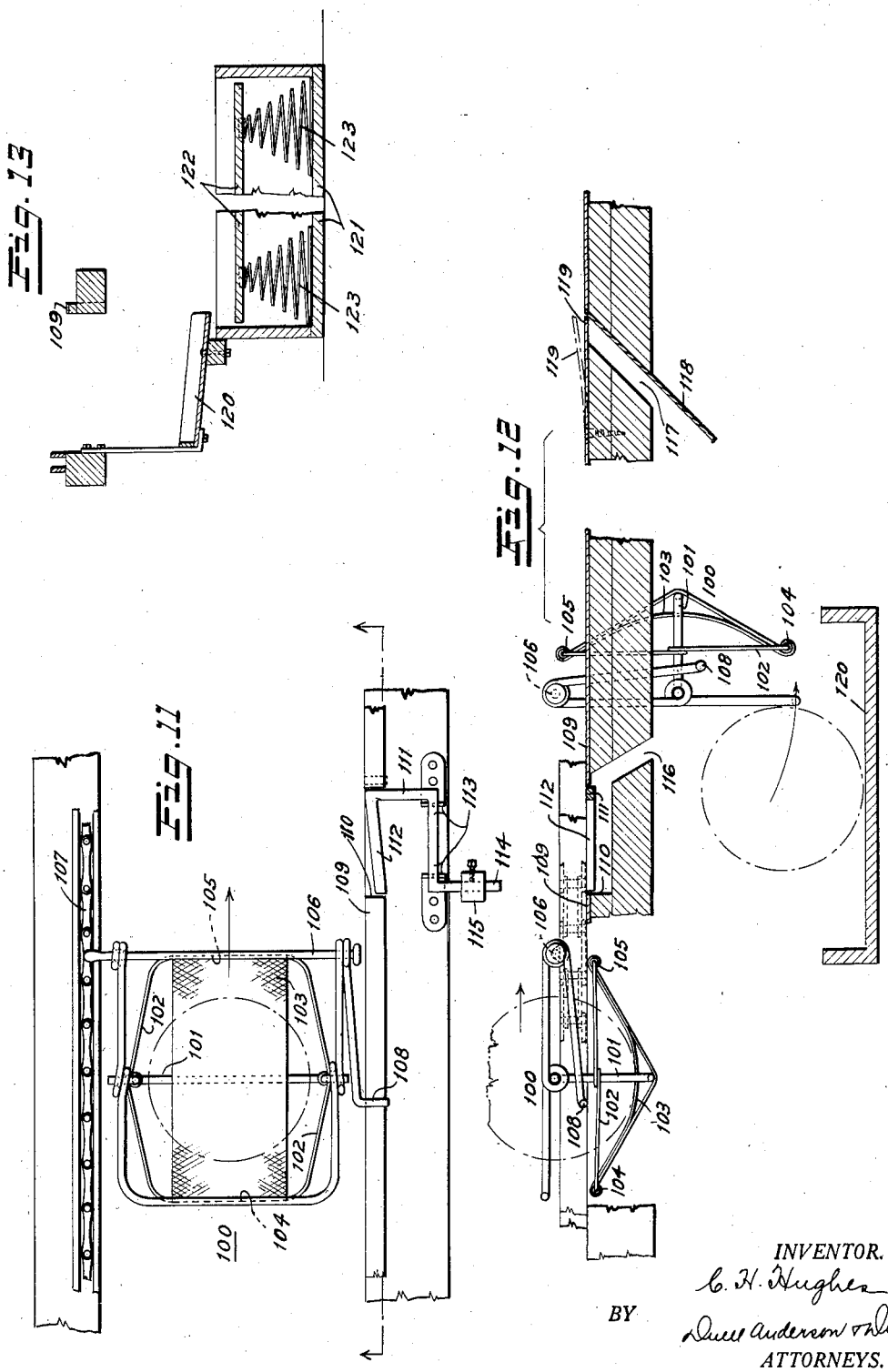

Patented Mar. 26, 1929.

1,706,734

UNITED STATES PATENT OFFICE.

CHARLES H. HUGHES, OF BENTONVILLE, ARKANSAS.

FRUIT-GRADING MACHINE.

Application filed April 14, 1926. Serial No. 101,853.

This invention relates to the grading of fruit for marketing and more particularly to machines designed to grade apples or other similar fruit.

An object of this invention is to provide a device of the character described which will assist in the rapid examination of the fruit and the sorting or grading thereof in accordance with the size and condition of the fruit, and automatically grade certain selected fruit by weight.

A further object is to provide a device of the character described which will insure complete inspection of the fruit while facilitating its handling.

A further object is to provide a device of the character described which will automatically grade certain selected fruit by the weight.

A further object is to provide a device which will operate with a minimum of labor and with a maximum of efficiency.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which:

Figure 1 is a plan view of a machine embodying this invention,

Fig. 2 is a similar view taken at a lower level with the upper portions removed, Fig. 3 is a longitudinal section along the line 3—3 of Figs. 1 and 2, Figs. 4 and 5 are sections along the lines 4—4 and 5—5 of Fig. 1, respectively, Fig. 6 is a side elevation of the machine.

Figs. 7, 8, 9 and 10 are details of automatic grading machinery;

Figs. 11 and 12 are details of a modified form of weight grading apparatus; and

Fig. 13 is a fragmental view of the fruit receiving member.

The invention is described more particularly as applied to the grading of apples.

The machine comprises in general apple receiving hopper 1, a cull separator 2, an inspection means 3, and the automatic grading machinery 4.

The hopper 1 comprises in general an apron 5 inclined toward the rest of the machine having fruit discharging spots 6 connected to its lower end. A central discharge opening 7 is surrounded by a ledge or wall 8 to prevent fruit accidentally falling through the opening for a purpose to be described. The main body of the apron 5 is preferably slatted as shown at 9 to eliminate dirt and twigs. Beneath the opening 7 is an inclined trough 10 leading to a chute 11.

The cull separator 2 comprises in general a pair of spirals 12 and 13 mounted for rotation around generally parallel axes with the spirals so arranged as to form a succession of pockets for the receipt of the fruit. One such pair of spirals is provided for each of the chutes 6 in position to receive apples delivered therefrom. The spirals 12 and 13 of each pair are so arranged as to provide pockets R for the receipt of the fruit, which pockets travel from the discharge mouth of the spout 6 toward the far end of the spirals. The spirals are so arranged however that the size of the pocket increases as the fruit is carried away from the spout. This may be arranged either by slightly inclining the axes of the spiral toward each other or by varying the diameter of the spiral rolls themselves from the one end toward the other.

With the foregoing construction, it will be clear that if apples are placed in the apron 5 they will move by gravity out of the apron 5 and be delivered one at a time upon the spirals 12 and 13. The apples so delivered will be carried toward the far end of the spirals and in the event that the apples are larger than the largest diameter which pockets R attain, the fruit will be discharged at the righthand end of these spirals. Any apple, however, which is of smaller diameter than this maximum diameter of the pockets R, will be dropped between the spirals into the chute 11 which lies immediately beneath them.

Means are provided for preventing the falling of apples between the spirals at the larger end comprising rods 14 which may be adjustably mounted in a cross-beam 15 in position to lie between the spirals 12 and 13. With this construction, it will be clear that by advancing the rod 14 toward the left, the maximum effective diameter of the pockets R and hence the maximum diameter of apple to be dropped between the spirals may be varied.

The inspection means 3 comprises rolls 16 and 17 rotating about parallel axes, one such pair of rolls being provided for each pair of spirals 12 and 13 and each pair being positioned to receive the apples from its corresponding pair of such spirals. Such inspection means is arranged to move the fruit forwardly toward the right at the same time exposing the maximum surface thereof to inspection. This can be arranged by rotating both rolls in the same direction. One of them, as for example the roll 16, is made in the form of a spiral while the other roll 17 is preferably smooth. This construction has the effect of rolling the fruit over and over as it moves along. The rolls 16 and 17 are sufficiently close together to cause the fruit to be supported from underneath rather than from the sides to facilitate pushing the fruit laterally over the one or the other of them in the process of hand grading to be described. Moreover, each pair of rolls 16 and 17 is sufficiently spaced from the pair of rolls next to it to permit fruit to pass between the pairs. There being four such pairs, there are thus provided five openings 18, 19, 20, 21 and 22 between the sets of rolls and between the sets and the outer frame into which apples may be flapped from the inspection rolls. The center and outside openings 20, 18 and 22, are designed to receive under sized apples which are carried back without further grading to a bin 23 while the other two openings 19 and 21 are designed to receive second grade apples which are carried forward to be graded by weight as will be hereinafter described. To accomplish these results, there is mounted below each of these openings a conveyor which may conveniently comprise spirals 24, 25, 26, 27 and 28 each of which operates in connection with deflectors 29, 30, 31, 32 and 33. The deflectors are arranged each beneath its corresponding opening 18, 19, 20, 21 and 22 and each deflector is inclined toward its corresponding spiral to cause the fruit to contact with the spiral. Alternate spirals are arranged to move the fruit in opposite directions. As illustrated they are arranged to have opposite pitch. The conveyors 24—29, 26—31 and 28—33 are arranged to carry fruit received thereon toward the left to discharge the same into the chute 23 as has been previously described while the conveyors 25, 30 and 27, 32 carry the fruit received thereon forwardly toward the right discharging the same onto similar conveyors 34—35, which carry the fruit to the far side of the weight grading device as will be later described. Each of the plates 29, 31 and 33 may terminate short of the partition 15 to permit the fruit being moved by the spirals to fall into the chute 23.

The numeral 40 comprises a track, of substantially endless form, which is divided into four portions numbered respectively 41, 42, 43 and 44. The portion 41 is situated adjacent to the delivery end of the inspection conveyor 16—17. The opposite portion 43 is adjacent to the delivery end of the conveyors 34, 35. The intermediate portions 42 and 44 pass adjacent to receiving bins 45, 46, 47, 48 and 49, 50, 51 and 52 respectively. Four such bins are shown in each set, but obviously any desired number may be employed.

Over the track 40 are caused to pass certain apple carriers 53 which are designed to receive the apples from the conveyors and discharge them into the proper bins selectively as will be hereinafter described. These conveyors comprise a pair of apple receiving members 54 and 55 of general quadrantal shape pivoted as at 56 and 57 so as to be movable from the position shown in Fig. 7 where the fruit may be deposited and retained therein to the position shown in Fig. 10 where the fruit will be discharged therefrom. To accomplish this movement, there is provided upon each of the pivots 56 and 57 intermeshing mutilated gears 58 and 59 while the shaft of the member 55 is projected and bent downwardly to form a trigger arm 60. In accordance with this construction the carrier will remain in the apple carrying position until the trigger 60 is moved whereupon both quadrantal members will be rotated to discharge the fruit. These quadrants comprise generally a metal frame lined with fabric, to protect the fruit from bruising.

The fruit carriers are supported on the inner side from an endless chain 61 to which each of the fruit carriers is pivotally attached. The connection on one side is sliding to facilitate the turn around the corner. This chain may travel in a groove to serve as a guide. The outer side of each fruit carrier is supported upon the trigger 60 resting upon the track 40. The trigger 60 is so designed that with the carrier in fruit retaining position, the trigger is on the forward side of dead center and in this position it rests upon and slides along the track as the carrier is moved by the chain 61.

The apple grading mechanism comprises a plurality of sections 62 of the track 40 which may be termed platforms, each of said sections being opposite one of the bins 45 to 52 and each section being pivoted as shown at 63 forwardly of its center so that its rearward end 64 may be depressed below the level of the remainder of the track. An arm 65 projects rearwardly and receives a weight 66 which is adjustable upon the arm as by a thumb nut 67. This bar is preferably graduated according to any desired scales. With this construction, it will be clear that as the apple carrier rides upon the track with the trigger 60 in engagement therewith, the apple will be retained in the carrier by reason of the fact that the trigger is in advance of its dead center. As the trigger 60 passes onto the platform 62 if the weight of the apple is insufficient to overcome the effect of the weight 66, the trigger continues to pass onto the next section of track as though the track were uninterrupted. Should, however, the weight of the apple be sufficient to overcome the weight 66, the platform 62 will be depressed and the trigger 60 will pass into engagement with the projecting end of the track beyond the platform as shown in Fig. 10, to be carried backwardly beyond its dead center and discharge the fruit into the corresponding bin. Immediately thereafterwards, the continuation of the movement of the carrier causes the trigger 60 to ride up over the edge of the platform as aforesaid and the carrier continues its movement in inverted position. It will be obvious that these devices will be so set as to discharge the larger apples into the first bins.

In order to restore the carriers in position again to receive fruit, there is provided upon the carrier frame a lug 68 and raised tracks 69 and 70 corresponding in position respectively to the track sections 43 and 41 which are arranged to engage the lug 68 of each fruit carrier in turn and lift the same an amount sufficient to permit the trigger 60 to pass its dead center due to the combined weights of the apple carriers and to return to its normal position. These tracks 69 and 70 may be continued, if desired, throughout the full length of the receiving sections 43 and 41, or they may be of only sufficient length to restore the apple carriers to their normal position.

Suitable shafting and gearing may be provided, as for example, the shaft 71, gears 72 and 73 for moving the chain 61 and the chains 74 and 75 may be connected to the shafts 71 for driving the grading and inspection spirals. It will be understood moreover that the spirals 12 and 13, 16 and 34 will all be so timed relative to each other and to the apple carriers that the apples will be received from the hopper 1, delivered to the culling device 2, passed in inspection over the rolls 3 and delivered to the apple carriers 53 in proper timed relation. The inclined conveyors may be driven by a round belt or rope, care being taken to prevent slipping.

For the purpose of preventing the discharge of fruit from the carriers 16, 17 and 34, 35, means are provided to prevent the discharge until the apple carriers are in position to receive it. This comprises as illustrated in Figs. 3 and 6, a barrier 76 in the pathway of each of the conveyors mounted upon a rod 77 pivoted at the sides of the frame so as to be movable to a position to permit the discharge of the fruit. This barrier is lifted automatically by the driving mechanism in proper timed relation to the movement of the carriers. To accomplish this result, there is provided on the shaft 77 a one toothed gear 78 meshing with a similar gear 79 driven by a pair of beveled gears 80, 81 on a shaft 90 which in turn is driven by a belt 91 from the shaft 92 which carries a sprocket 93 by which the chain 61 is driven. It will be obvious that the proportioning of the belt pulleys and gearing is such that the barrier 76 will be lifted once while four selectors pass a given point and that the movement will be properly timed so that the barrier is lifted as a carrier comes opposite the point of conveyor discharge.

The operation of the device will in general be evident from the foregoing description. Apples are deposited in the bin 1 and moved by gravity toward the rolls 12, 13. During this movement defective apples and apples obviously below grade may be picked up and thrown into the central orifice 7, thence passing into the receptacle 11 for culls. Thus apples received by the culling spirals 12 and 13 are passed onwardly toward the inspection mechanism 16, 17, but any apple which is below the predetermined minimum, will pass downwardly between the spirals 12, 13 and fall into the cull receptacle. The rolls 16 and 17 receive the apples from the spirals 12, 13 and keep them in constant rotation for purposes of inspection as they are passed to the right as seen in Fig. 1. During this inspection, apples which are first-class are not disturbed but apples of the B and C grade are flipped from the conveyor toward the inside or outside, apples of the B grade being cast into the compartments 19 and 21 while apples of the C grade go into the openings 18, 20 and 22. It will thus be seen that the C grade apples are conveyed backwardly by the conveyors into the compartment 23 as described, while the B grade apples are carried forwardly by the conveyors 34, 35 to be sorted by weight into the bins 49 to 52. A grade apples passing onwardly from the conveyors 16 and 17 are delivered into the fruit carriers at 41, the four carriers being preferably loaded simultaneously by the four pairs of conveyors. These carriers then pass to the position 42 and each successively discharges its contents into the bin 45 to 48 which correspond to the weight of the apple conveyor. The empty conveyors then pass to the track 69 where they are restored to apple receiving position and are again filled with apples by the conveyors 34 and 35, though here of course the apples supplied are the B grade apples. These apples pass onwardly to position 44 where they are graded by weight in a manner similar to that already described for the A grade apples. The empty receivers are then restored to apple receiving position by engagement with the track 70 and the operation continues as before. It will thus be seen that the weight grading devices are continuously operated, performing their functions both upon the outward movement and upon their return, thus greatly reducing the space required for grading a given number of apples.

In the modified form of weight grading device shown in Figs. 11 and 12, the fruit receiver comprises a basket 100 which may be of generally rectangular form, and may be made of bent wire as illustrated having a depending U-shaped arm 101 supporting a sub-frame 102 which carries a canvas band 103 loosely stretched between opposing sides 104, 105 for the reception of the fruit.

This basket 100 is supported in upright position to carry fruit but is adapted to be pivoted about an axis to permit the fruit to be discharged as shown in Fig. 12, should the weight of the fruit exceed a predetermined amount. To accomplish this result and to move the basket into correlation with the conveyors and the grading machinery, the receiver is pivoted at its front side to a pin 106 carried by a chain 107 corresponding to the chain 61 in the previously described construction, supported on the side opposite the chain by a finger 108 bearing upon the track 109 corresponding to the track 60 previously described. The pivot 106 is preferably disposed at the advance edge of the fruit carrier on the side toward the chain, while the finger 108 is preferably situated near the rearward edge of the fruit carrier on the opposite side.

In accordance with this construction, it will be evident that the fruit receiver is supported in horizontal fruit receiving position so long as the finger 108 is supported by the track 109. Should, however, this support cease, the fruit carrier is in position to move about the axis 106 at its front edge to reach the position shown in Fig. 12 to discharge the fruit. To accomplish this result, the track 109 is interrupted as shown at 110 and in this interruption there is supplied a weighing member 111 which comprises a track member 112 which is in effect a section of the track which is movable vertically but which is yieldingly held in position to serve as a continuation of said track. As illustrated, the member 111 is pivoted about an axis 113 and carries on the other side of said axis a projecting arm 114 on which is adjustably placed a weight 115, and the member 112 is so positioned relative to the axis 113 and the weight 115 that when a finger 108 of a carrier 100 containing an apple of a predetermined size passes onto the track section 112, it will just be sufficient to depress the member 112 to discharge the apples. That portion of the track member 112 which first comes in contact with the finger 108 is arranged closer to the axis 113 than the other end, so that the tendency of the apple to depress the track increases from the advance end to the latter end of the member 112. It will thus be seen that an apple of sufficient weight to cause any depressing action whatever upon the advance end of the member 112 is assisted in completely depressing the member by the increase in leverage thus afforded as the finger approaches the latter end of the member 112. Thus, any tendency toward uncertain action on the part of the weight of the selector due to an apple approaching closely to the size for which the weight 115 is set is avoided.

To permit the finger 108 to drop completely below the track 109 whenever the member 112 is depressed, a passageway 116 is provided through the track 109 and in position to be entered by the said finger as a carriage moves along. For the purpose of again restoring the apple carrier to apple receiving position, there is provided a groove 117 carrying a depending deflector 118 in position to engage the finger 108 as it hangs below the track. Opposite the groove 117, the track 109 is formed of a spring member 119 which is normally in position to keep the track substantially continuous but which may be raised by the finger 108 as it ascends through the groove 117 to permit the finger to slip upon the top surface of the track.

Beneath the point of discharge of the apple carrier, there is provided a chute 120. Should the machine be operating upon fruit which is so closely graded that a large percentage of the fruit comes within a single class, it may be found that the fruit is delivered faster than it can be conveniently wrapped. It is not desirable to permit fruit to fall into a bin since such falling may cause bruises upon the fruit. To avoid this, there is provided a receptacle 121 having a false bottom 122 resiliently supported by springs 123, and these springs are of such strength as to yield to the weight of a layer of apples substantially in amount equal to the thickness of the layer so that at all times the apples discharged from the chute 120 may roll over on top of the fruit already in the receptacle without falling.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A device of the character described, comprising, in combination, a pair of cylindrical members for supporting fruit having a progressively increasing opening between them from one end toward the other, means for moving the fruit from the one end toward the second, whereby the fruit is graded by the change in the size of said opening, and means for predetermining the maximum size fruit which may pass through said opening, comprising an element for limiting the portion of the opening through which said fruit may fall.

2. A device of the character described, comprising, in combination, a pair of cylindrical members close together compared to the size of the fruit and means for moving said fruit from one end of said cylindrical members to the other, a conveyor disposed beneath the outer edge of one of said cylindrical members in position to receive fruit pushed therefrom, and separate receiving bins for receiving fruit from said cylindrical members and from said conveyor respectively.

3. A device of the character described, comprising, in combination, a fruit carrier capable of being closed and opened to receive and discharge fruit, a trigger adapted to hold said carrier in the closed position and supporting a predetermined portion of the weight of said fruit, a track on which said trigger travels and means associated with said track and operable by the weight of said fruit for releasing said trigger to discharge said fruit.

4. In a device of the character described, comprising, in combination, a smooth cylinder a spiral cylinder rotating in the same direction a distance apart which is small compared to the diameter of the fruit to be graded, and separate conveyors disposed below the outside edge of each of said cylinders for receiving fruit ejected therefrom.

5. A fruit carrier of the character described, comprising, in combination, a pair of substantially quadrant shaped members, means for pivoting said members at their outer edges to swing toward and away from each other, and means for connecting said members for operation in unison.

6. A fruit carrier of the character described, comprising, in combination, a pair of substantially quadrant shaped members, each having a fabric lining, means for pivoting said members at their outer edges to swing toward and away from each other, means for connecting said members for operation in unison.

7. A fruit carrier of the character described, comprising, in combination, a pair of substantially quadrant shaped members, means for pivoting said members at their outer edges to swing toward and away from each other, means for connecting said members for operation in unison, means for translating said carrier, from one position to another, means associated with one position for closing said members, and means associated with the other for opening said members.

In testimony whereof I affix my signature.

CHARLES H. HUGHES.